UNITED STATES PATENT OFFICE.

HENRY CHARLES JENKINS AND HUGH WOOLNER, OF LONDON, ENGLAND.

PROCESS FOR THE MANUFACTURE OF PERMANGANATES.

1,377,485.

Specification of Letters Patent. Patented May 10, 1921.

No Drawing. Application filed February 3, 1919. Serial No. 274,701.

*To all whom it may concern:*

Be it known that we, HENRY CHARLES JENKINS, a subject of the King of Great Britain, residing at 815/7, Salisbury House, London, England, and HUGH WOOLNER, a subject of the King of Great Britain, residing at 810/1, Salisbury House, London, England, have invented a new and useful Improved Process for the Manufacture of Permanganates, of which the following is a specification.

This invention relates to an improved process for the manufacture of potassium permanganate.

According to this invention, sodium manganate and manganite are made by a fusion process, the main primary materials employed (other than those derived from the process) being manganese dioxid and caustic soda, magnanate being then transformed by electrolysis to permanganate, which is then separated from the liquor, largely by precipitation, for example by the addition of potash or a potassium salt.

The method of procedure includes (1) a lengthy and gentle fusion process in which a large excess of sodium hydroxid is employed preferably in the presence of a small quantity of potassium hydroxid, (2) a dissolving of the fused mass in a liquor which is derived from the electrolytic process or in water, (3) separation of a solution containing sodium (and potassium) manganate and other soluble materials, from the mud (*i. e.*, $Mn_2O_3$ mud present), said mud being thereafter added to the primary manganese dioxid, (4) the known electrolytic process of converting sodium manganate into permanganate, (5) precipitation of potassium permanganate and employment of the residual solution as a solvent of the fused material or as an addition to the primary manganese dioxid and (6) return of the liquor from which the permanganate recrystalized for admixture with the primary material employed.

The invention may be carried out as follows:—

*Stage 1.—The production of a manganate and some manganite mainly of soda.*

To 120 lbs. manganese dioxid (pyrolusite), which may be partly replaced by the mixture of lower oxids of manganese mud produced in the process, 40 gallons of 40% soda lye (NaOH solution) and the equivalent of 12 lbs. of dry manganate residuals (this may be effected by adding the calculated equivalent of the lye of the liquor obtained by evaporation of the liquor from which a permanganate has been precipitated) are evaporated to dryness while stirring preferably in an open iron pan and when dry maintained for about six hours at about 250° to 300° C.

The temperature of the mixture is now brought to a very dull red and maintained in fusion at the dull red heat, and freely exposed to the atmosphere or dry air blown in as needed. The total time per charge is from twelve to twenty-four hours.

The presence of some potassium compounds is desirable, since their presence enables the manganese to be more highly oxidized than when the alkali is entirely soda; the potash is derived from the residues after recrystallization and no special addition of potash is necessary.

In some cases as when manganese mud is used, or according to the commercial manganese dioxid employed or when lower manganese oxids are present in the charge, it may be necessary to assist oxidation by the addition of chlorate of soda, or the oxidation may be entirely effected by its addition in which case to the mixture above set out 22 lbs. and upward of sodium chlorate are added.

By this treatment the manganese is oxidized from $MnO_2$ up to an oxygen ratio approximating to that of $Mn_2O_5$.

*Stage 2.*

The melt is as it cools broken up coarsely and either dissolved cold in a liquor containing permanganate and produced as hereinafter described, or solution is effected in 80 gallons of water at about 20° C.

The solution is allowed to settle for about 48 hours and then filtered. The filtration should be carried out in a manner to thoroughly remove all traces of the mud as even small quantities of the mud which is excessively fine have a prejudicial effect on subsequent operations and lead to serious loss of permanganate. The material employed for the filtration should have fine pores and should be one not injured by the liquor; biscuit porcelain has been found to be very suitable. The clear green liquor obtained should contain sodium manganate equivalent on titration to about 6 grams permanganate per 100 c. c. and its specific gravity is about 1.25.

Stage 3.—The electrolysis of sodium manganate.

The electrolysis to permanganate may take place in any usual manner, but preferably we employ nickel anodes and iron cathodes. The voltage may be 4 volts and the liquor requires about 150 ampere hours per gallon, and we find 20° to 30° C. to be a suitable temperature.

During electroylsis the green manganate is converted into the red permanganate until titration indicates 7½ grams of permanganate per 100 c. c. when the operation is finished and the cells discharged.

Stage 4.—Transformation of sodium permanganate into potassium permanganate.

This is effected by adding a strong solution of about 0.5 to 0.6 lb. per gallon of potassium chlorid or the equivalent of carbonate, hydroxid or other potassium salt. The whole is well stirred and allowed to settle for from three to four days at a temperature of about 10° C. or as near to freezing as can conveniently be secured. Potassium permanganate separates out and precipitates itself during the slow cooling that follows and is recovered with some of the stock liquor as first crystals. These are collected and drained and recrystallized in the usual manner.

The liquid is now again filtered through biscuit porcelain to take out any manganese precipitates or any fine crystals and is (if free from carbonate) evaporated to half its bulk when it is ready to be used again in a further fusion process, or may be used to dissolve the melt as herein before described and its soda and manganate utilized. Excess of chlorid is eliminated at this stage by allowing the lye to cool and settle and then decanting it. Any alkaline corbonate can be likewise separated and the alkali made available again in caustic form in the well known manner.

What we claim is:—

1. An improved process for the manufacture of potassium permanganate, which consists in fusing together manganese dioxid with an excess of an alkaline sodium compound at a dull red heat with the employment of an oxidizing agent, dissolving the melt, completely separating the solution from the manganese mud, electrolyzing the liquor to produce permanganate, forming and separating potassium permanganate from the permanganate liquor by the addition of a potassium compound, reusing the sodium compounds in the remaining liquor in the first step of the process.

2. An improved process for the manufacture of potassium permanganate which consists in fusing together a mixture comprising manganese dioxid, a potassium salt and an excess of caustic soda at a dull red heat with the employment of an oxidizing agent, dissolving the melt, separating the solution from the manganese mud and electrolyzing the liquor to produce permanganate, converting the permanganate into potassium permanganate by adding a potassium compound and maintaining a low temperature to cause the separation of the potassium permanganate.

3. An improved process for the manufacture of permanganates which consists in fusing together a mixture comprising manganese dioxid, sodium chlorate and an excess of an alkaline sodium compound at a dull red heat, dissolving the melt, separating the solution from the manganese mud and electrolyzing the liquor to produce permanganate.

4. An improved process for the manufacture of potassium permanganate which consists in fusing together manganese dioxid with an excess of a sodium compound at a dull red heat with the employment of an oxidizing agent, dissolving the melt, separating the solution from the manganese mud by filtration, electrolyzing the liquor to produce permanganate, the separating potassium permanganate from the permanganate liquor by the addition of a potassium compound and utilizing the liquor from which the permanganate has been separated in the process.

5. An improved process for the manufacture of potassium permanganate which consists in fusing together manganese dioxid with an excess of an alkaline sodium compound at a dull red heat with the employment of an oxidizing agent, dissolving the melt, filtering the liquor obtained through a material having a sufficient fineness of pore to completely remove all traces of manganese mud from the solution, electrolyzing the liquor to produce potassium permanganate, separating the potassium permanganate from the permanganate liquor by the addition of a potassium compound and utilizing the liquor from which the permanganate has been separated in the process.

6. In the manufacture of permanganate the improvement which comprises fusing together a manganese oxid with an excess of an alkaline sodium compound, while allowing oxidation, to form sodium manganate, dissolving the melt and filtering the liquor thereby obtained, through biscuit porcelain.

7. An improved process for the manufacture of potassium permanganate which consists in fusing together manganese dioxid with an excess of an alkaline sodium compound at a dull red heat with the employment of an oxidizing agent, dissolving the melt, separating the solution from the manganese mud, electrolyzing the liquor to produce permanganate, forming and separating potassium permanganate from the permanganate liquor by the addition of potassium chlorid, concentrating the liquor so obtained, separating the chlorids so precipitated and utilizing the sodium containing residues in the process.

8. An improved process for the manufacture of potassium permanganate, which consists in fusing together manganese dioxid with an excess of an alkaline sodium compound at a dull red heat with the employment of an oxidizing agent, dissolving the melt, separating the solution from the manganese mud, electrolyzing the liquor to produce permanganate, separating the potassium permanganate and utilizing the liquor from which the permanganate has been separated in the process.

9. An improved process for the manufacture of potassium permanganate, which consists in fusing together manganese dioxid with an excess of an alkaline sodium compound at a dull red heat, with the employment of an oxidizing agent, dissolving the melt, filtering the liquor obtained through biscuit porcelain, electrolyzing the liquor to produce permanganate, separating the potassium permanganate from the permanganate liquor by the addition of a potassium compound and utilizing the liquor from which the permanganate has been separated in the process.

10. In the manufacture of permanganate by fusing together a manganese oxid with an alkaline sodium compound while allowing oxidation, dissolving the melt, separating insolubles from the resultant solution and oxidizing to form permanganate, the herein described improvement which comprises completely separating the insolubles from the liquor produced by dissolving the melt, by filtering said liquor through a porcelain filter.

11. An improved process for the manufacture of potassium permanganate which consists in electrolyzing sodium manganate to produce permanganate, forming and separating potassium permanganate from the permanganate liquors by the addition of a potassium compound, and reusing the sodium compounds for the manufacture of sodium manganate.

In testimony that we claim the foregoing as our invention we have signed our names this seventh day of January, 1919.

HENRY CHARLES JENKINS.
HUGH WOOLNER.